United States Patent
Kim et al.

(10) Patent No.: US 12,331,139 B2
(45) Date of Patent: Jun. 17, 2025

(54) METHOD OF PREPARING VINYL CHLORIDE-BASED POLYMER COMPOSITE

(71) Applicant: LG CHEM, LTD., Seoul (KR)

(72) Inventors: Kun Ji Kim, Daejeon (KR); Seong Yong Ahn, Daejeon (KR); Heung Kwon Bae, Daejeon (KR); Se Woong Lee, Daejeon (KR); Hyun Kyou Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 562 days.

(21) Appl. No.: 17/781,223

(22) PCT Filed: Jun. 25, 2021

(86) PCT No.: PCT/KR2021/008027
§ 371 (c)(1),
(2) Date: May 31, 2022

(87) PCT Pub. No.: WO2022/005118
PCT Pub. Date: Jan. 6, 2022

(65) Prior Publication Data
US 2023/0002517 A1    Jan. 5, 2023

(30) Foreign Application Priority Data

Jul. 3, 2020 (KR) ........................ 10-2020-0082134

(51) Int. Cl.
| C08L 27/06 | (2006.01) |
| C08F 2/02 | (2006.01) |
| C08F 14/06 | (2006.01) |
| C08L 39/06 | (2006.01) |

(52) U.S. Cl.
CPC ................ C08F 14/06 (2013.01); C08F 2/02 (2013.01); C08L 39/06 (2013.01); *C08L 27/06* (2013.01); *C08L 2201/08* (2013.01); *C08L 2201/10* (2013.01)

(58) Field of Classification Search
None
See application file for complete search history.

(56) References Cited

U.S. PATENT DOCUMENTS

| 4,048,260 | A | 9/1977 | Haaf et al. |
| 6,340,729 | B1 | 1/2002 | Bonardi et al. |
| 2016/0311943 | A1 | 10/2016 | Youk et al. |
| 2017/0121438 | A1 | 5/2017 | Ju et al. |
| 2018/0009921 | A1* | 1/2018 | Kim ...................... C08F 226/10 |
| 2018/0044451 | A1 | 2/2018 | Phung et al. |
| 2018/0355078 | A1 | 12/2018 | Ahn et al. |

FOREIGN PATENT DOCUMENTS

| CN | 1335326 A | 2/2002 |
| CN | 1401672 A | 3/2003 |
| CN | 105713318 A | 6/2016 |
| CN | 105916892 A | 8/2016 |
| CN | 107056972 A | 8/2017 |
| CN | 108290978 A | 7/2018 |
| EP | 0481325 A2 | 4/1992 |
| EP | 3357942 A1 | 8/2018 |
| JP | H07-2881 B2 | 1/1995 |
| JP | H10-226705 A | 8/1998 |
| JP | 2002-047352 A | 2/2002 |
| JP | 2016-023228 A | 2/2016 |
| JP | 2018-507311 A | 3/2018 |
| KR | 10-0787370 B1 | 12/2007 |
| KR | 10-2012-0007227 A | 1/2012 |
| KR | 10-2016-0035439 A | 3/2016 |
| KR | 10-2017-0004703 A | 1/2017 |
| KR | 10-2018-0034223 A | 4/2018 |

OTHER PUBLICATIONS

Dong, J. et al., "Studies of the structure and thermal degradation of poly(vinyl chloride)-poly(N-vinyl-2-pyrrolidone) blends by using Raman and FTIR emission spectroscopy". Polymer Degradation and Stability 1997, 58(1-2), 159-169. (Year: 1997).*
International Search Report (with translation) and Written Opinion dated Oct. 13, 2021, issued in corresponding International Patent Application No. PCT/KR2021/008027.
J. C. Santos et al., "Comparison of Techniques for the Determination of Conversion during Suspension Polymerization Reactions," Brazilian Journal of Chemical Engineering, 2008, vol. 25, No. 2, pp. 399-407.
Danni Wang et al., "Effect of PVP in Dispersion and Seeded Dispersion Polymerizations," Journal of Applied Polymer Science, 2002, vol. 84, No. 14, pp. 2721-2732.
Extended European Search Report issued in corresponding European Patent Application No. 21833152.8 dated Jan. 25, 2023.
Ahmed Bhran et al., "Preparation of PVC/PVP composite polymer membranes via phase inversion process for water treatment purposes," Chinese Journal of Chemical Engineering, 26 (2018), pp. 715-722.
Office Action dated Feb. 26, 2025 issued in Korean patent application 10-2020-0082134.

* cited by examiner

Primary Examiner — Richard A. Huhn
(74) Attorney, Agent, or Firm — Morgan, Lewis & Bockius LLP

(57) ABSTRACT

Provided is a method of preparing a vinyl chloride-based polymer composite, which includes: bulk-polymerizing vinyl chloride-based monomers to prepare a vinyl chloride-based polymer; and preparing a vinyl chloride-based polymer composite including the vinyl chloride-based polymer and polyvinylpyrrolidone.

9 Claims, No Drawings

METHOD OF PREPARING VINYL CHLORIDE-BASED POLYMER COMPOSITE

CROSS-REFERENCE TO RELATED APPLICATION

This application claims priority to and the benefit of Korean Patent Application No. 10-2020-0082134, filed on Jul. 3, 2020, the disclosure of which is incorporated herein by reference in its entirety.

TECHNICAL FIELD

The present invention relates to a method of preparing a vinyl chloride-based polymer composite, and specifically, to a method of preparing a vinyl chloride-based polymer composite whose thermal stability, transparency, and color characteristics are improved.

BACKGROUND ART

Vinyl chloride-based polymers may be prepared by suspension polymerization, emulsion polymerization, or bulk polymerization. Among them, bulk polymerization enables the preparation of a high-purity polymer by using a minimum amount of additive and has an advantage of a simple device and a high polymerization rate.

However, in the case of bulk polymerization, temperature control is difficult due to a large amount of heat generated in the polymerization process. Also, in the case of bulk polymerization, there are no materials capable of absorbing and removing the heat of polymerization apart from a vinyl chloride-based monomer, and the viscosity of a polymer increases as polymerization proceeds, and thus the diffusion of the heat of reaction by conduction or convection is difficult. As a result, the vinyl chloride-based polymer prepared by bulk polymerization may be thermally damaged due to the heat of reaction generated in the bulk polymerization process or unexpectedly generated heat, so it is very important to ensure the thermal stability of the vinyl chloride-based polymer.

Accordingly, to ensure thermal stability, Chinese Laid-Open Patent Publication No. 107056972 proposes using a specific type of initiator composition in a pre-polymerization step (preliminary polymerization step). In addition, Korean Laid-Open Patent Publication No. 2016-0035439 proposes a preparation method in which an oxocarboxylic acid, inorganic phosphate, or ethylenediaminetetraacetate is added during bulk polymerization. Additionally, Korean Laid-Open Patent Publication No. 2017-0004703 proposes a preparation method in which copolymerization with a comonomer having excellent heat resistance is performed.

However, the thermal stability of the vinyl chloride-based polymer was not sufficiently improved only by the conventionally proposed methods.

RELATED-ART DOCUMENTS

Patent Documents (Patent Document 1) CN107056972A
(Patent Document 2) KR2016-0035439A
(Patent Document 3) KR2017-0004703A

DISCLOSURE

Technical Problem

The present invention is directed to providing a method of preparing a vinyl chloride-based polymer composite whose thermal stability, transparency, and color characteristics are all improved.

Technical Solution

One aspect of the present invention provides a method of preparing a vinyl chloride-based polymer composite, which comprises: bulk-polymerizing vinyl chloride-based monomers to prepare a vinyl chloride-based polymer; and preparing a vinyl chloride-based polymer composite including the vinyl chloride-based polymer and polyvinylpyrrolidone.

Another aspect of the present invention provides a method of preparing a vinyl chloride-based polymer composite, which includes bulk-polymerizing vinyl chloride-based monomers in the presence of polyvinylpyrrolidone.

Advantageous Effects

A vinyl chloride-based polymer composite prepared by a preparation method according to the present invention is remarkably excellent in thermal stability, transparency, and color characteristics by including polyvinylpyrrolidone.

In addition, since the method of preparing a vinyl chloride-based polymer composite according to the present invention is performed in the presence of polyvinylpyrrolidone, thermal damage to a vinyl chloride-based polymer composite, which occurs due to the heat generated in bulk polymerization, can be prevented. Additionally, since polyvinylpyrrolidone is capable of suppressing side reactions of an initiator, the coloration of a vinyl chloride-based polymer composite, which is caused by the side reactions of an initiator, can be minimized to substantially improve the transparency and color characteristics of a vinyl chloride-based polymer composite.

In addition, the method of preparing a vinyl chloride-based polymer composite according to the present invention can prevent thermal damage to a vinyl chloride-based polymer composite, which is caused by the heat applied in a post-treatment process for removing unreacted monomers.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, a "vinyl chloride-based polymer" may be a homopolymer prepared by polymerizing a vinyl chloride-based monomer alone or a copolymer prepared by copolymerizing a vinyl chloride-based monomer and a comonomer copolymerizable with the vinyl chloride-based monomer. The vinyl chloride-based monomer may be vinyl chloride. The comonomer may be one or more selected from the group consisting of ethylene, propylene, vinyl acetate, vinyl propionate, acrylonitrile, methyl vinyl ether, ethyl vinyl ether, acrylic acid, acrylic anhydride, methacrylic acid, methacrylic anhydride, itaconic acid, itaconic anhydride, maleic acid, and maleic anhydride.

In the present invention, the "number-average molecular weight of a vinyl chloride-based polymer" may be 100 to 100,000, preferably 500 to 80,000, and more preferably 1,000 to 50,000.

In the present invention, the "degree of polymerization of a vinyl chloride-based polymer" may be 200 to 3,500, preferably 500 to 3,000, and more preferably 600 to 2,500.

In the present invention, the "number-average molecular weight of a vinyl chloride-based polymer" may be measured by gel permeation chromatography, and the "degree of polymerization of a vinyl chloride-based polymer" may be measured by specific viscosity measurement.

In the present invention, the "weight-average molecular weight of polyvinylpyrrolidone may be measured by gel permeation chromatography.

As used herein, the term "initiator" may refer to a polymerization initiator. The initiator may be one or more selected from the group consisting of dicumyl peroxide, dipentyl peroxide, di(3,5,5-trimethylhexanoyl)peroxide, dilauroyl peroxide, diisopropyl peroxydicarbonate, di-sec-butyl peroxydicarbonate, di(2-ethylhexyl) peroxydicarbonate, t-butyl peroxy neodecanoate, t-butyl peroxy neoheptanoate, t-amyl peroxy neodecanoate, cumyl peroxy neodecanoate, cumyl peroxy neoheptanoate, 1,1,3,3-tetramethylbutyl peroxy neodecanoate, azobis-2,4-dimethylvaleronitrile, potassium persulfate, and ammonium persulfate.

1. Vinyl Chloride-Based Polymer Composite Preparation Method 1

A method of preparing a vinyl chloride-based polymer composite according to an embodiment of the present invention comprise: bulk-polymerizing vinyl chloride-based monomers to prepare a vinyl chloride-based polymer; and preparing a vinyl chloride-based polymer composite including the vinyl chloride-based polymer and polyvinylpyrrolidone.

The polyvinylpyrrolidone is a stabilizer and may serve to protect the vinyl chloride-based polymer from an external factor, specifically, heat. As a result, the thermal stability of the vinyl chloride-based polymer composite may be substantially improved. Also, the polyvinylpyrrolidone is able to control the size and degree of dispersion of vinyl chloride-based polymer particles, and thus the transparency and color characteristics of the vinyl chloride-based polymer composite may be substantially improved.

Therefore, when a vinyl chloride-based polymer composite including the vinyl chloride-based polymer and polyvinylpyrrolidone is prepared after the completion of polymerization, the vinyl chloride-based polymer composite may be prevented from being thermally damaged in a post-treatment process. Also, high-pressure input equipment for inputting polyvinylpyrrolidone may be unnecessary.

The vinyl chloride-based polymer composite may include the polyvinylpyrrolidone in a state of being adsorbed onto the vinyl chloride-based polymer. In this case, the adsorption may refer to physical adsorption by Van der Waals fierce.

The polyvinylpyrrolidone may have a weight-average molecular weight of 6,000 to 2,000,000 g/mol, and preferably, 10,000 to 1,700,000 g/mol. When the above-described condition is satisfied, the thermal stability and transparency of the vinyl chloride-based polymer composite can be improved, and viscosity that enables uniform dispersion in the vinyl chloride-based polymer composite can be achieved.

Meanwhile, the polyvinylpyrrolidone used in the present invention differs from polyvinylpyrrolidone used as a dispersant in typical suspension polymerization and microsuspension polymerization of a vinyl chloride-based polymer. Since polyvinylpyrrolidone used in typical suspension polymerization and microsuspension polymerization is added before the initiation of polymerization or at the beginning of polymerization to aid the formation of a droplet in a reaction mixture including vinyl chloride-based monomers, it serves to increase the dispersibility of vinyl chloride-based monomers and initial vinyl chloride-based polymer particles in a polymerization solvent. Accordingly, the size and porosity of the prepared polymer particles, particularly, initial polymer particles, are controlled to prevent the formation of coarse polymer particles, and thus the properties of the polymer, such as viscosity, processability, and the like, are prevented from being degraded.

In addition, the polyvinylpyrrolidone used in the present invention differs from polyvinylpyrrolidone used in seeded emulsion polymerization and pure emulsion polymerization of a vinyl chloride-based polymer. Since polyvinylpyrrolidone used in seeded emulsion polymerization and pure emulsion polymerization is used as an emulsifier, it serves to increase the dispersibility of vinyl chloride-based monomer droplets.

As described above, the polyvinylpyrrolidone added in typical suspension polymerization, microsuspension polymerization, seeded emulsion polymerization, and pure emulsion polymerization is intended to increase the dispersibility of vinyl chloride-based monomers and initial vinyl chloride-based polymer particles in a polymerization solvent, and the polyvinylpyrrolidone added in bulk polymerization according to an embodiment of the present invention is intended to protect a vinyl chloride-based polymer from heat applied after the completion of polymerization, specifically, heat applied in the post-treatment process performed after the recovery of unreacted monomers, so the uses thereof are different.

The vinyl chloride-based polymer composite may include the polyvinylpyrrolidone in an amount of 0.003 to 0.5 parts by weight, and preferably, 0.005 to 0.5 parts by weight with respect to 100 parts by weight of the vinyl chloride-based monomers. When the above-described range is satisfied, a vinyl chloride-based polymer composite whose thermal stability, color characteristics, and transparency are excellent can be prepared.

The polyvinylpyrrolidone may be in the state of a solution where it is mixed with an aqueous solvent. When the polyvinylpyrrolidone in a solution state is included in the vinyl chloride-based polymer composite, more uniform dispersion may be made, and thus the thermal stability, transparency, and color characteristics of the vinyl chloride-based polymer can be improved. Also, for more uniform dispersion, a stirring process may be performed.

The content of the polyvinylpyrrolidone in a solution may be 1 to 10 wt %, preferably 1 to 7 wt %, and more preferably 3 to 5 wt %.

Meanwhile, the preparation of a vinyl chloride-based polymer may be performed by bulk-polymerizing the vinyl chloride-based monomers and then recovering unreacted vinyl chloride-based monomers. Specifically, the preparation of a vinyl chloride-based polymer may be performed by hulk-polymerizing vinyl chloride-based monomers to prepare particle nuclei; and bulk-polymerizing vinyl chloride-based monomers in the presence of the particle nuclei and then recovering unreacted vinyl chloride-based monomers. As described above, when particle nuclei are first prepared, the preparation yield of a vinyl chloride-based polymer may be substantially improved. Also, when a vinyl chloride-based polymer composite is prepared after the recovery of unreacted vinyl chloride-based monomers, polyvinylpyrrolidone may be adsorbed onto a vinyl chloride-based polymer rather than a vinyl chloride-based monomer, and thus the effect of polyvinylpyrrolidone may be maximized, and the loss of polyvinylpyrrolidone may be minimized.

Meanwhile, the bulk polymerization may be performed in the presence of an initiator.

2. Vinyl Chloride-Based Polymer Composite Preparation Method 2

A method of preparing a vinyl chloride-based polymer composite according to another embodiment of the present invention includes bulk-polymerizing vinyl chloride-based monomers in the presence of polyvinylpyrrolidone.

When the bulk polymerization is performed in the presence of polyvinylpyrrolidone, damage to a vinyl chloride-based polymer, which occurs due to the heat generated during the bulk polymerization may be prevented. Also, the polyvinylpyrrolidone may suppress side reactions of an initiator. Therefore, the coloration of a vinyl chloride-based polymer, which is caused by the side reactions of an initiator, is minimized, and thus the transparency and color characteristics of the vinyl chloride-based polymer composite may be substantially improved. Further, since the polyvinylpyrrolidone is a water-soluble material, it is not compatible with the vinyl chloride-based monomer and an oil-soluble initiator and thus does not act as a factor that hinders bulk polymerization, As described in "1. Vinyl chloride-based polymer composite preparation method 1", the polyvinylpyrrolidone added in typical suspension polymerization, microsuspension polymerization, seeded emulsion polymerization, and pure emulsion polymerization is intended to increase the dispersibility of vinyl chloride-based monomers and initial vinyl chloride-based polymer particles in a polymerization solvent, and the polyvinylpyrrolidone added in bulk polymerization according to another embodiment of the present invention is intended to protect a vinyl chloride-based polymer from heat applied in an exothermic phenomenon whose control is difficult as polymerization proceeds without a polymerization solvent, so the uses thereof are different.

The polyvinylpyrrolidone may be present in an amount of 0.003 to 0.5 parts by weight, and preferably, 0.005 to 0.5 parts by weight with respect to 100 parts by weight of the vinyl chloride-based monomers. When the above-described range is satisfied, the thermal stability, color characteristics, and transparency of the vinyl chloride-based polymer composite can be improved.

Meanwhile, the bulk polymerization may comprise: bulk-polymerizing, the vinyl chloride-based monomers in the presence of the polyvinylpyrrolidone to prepare particle nuclei; and bulk-polymerizing the vinyl chloride-based monomers in the presence of the particle nuclei to prepare a vinyl chloride-based polymer composite. When the above-described condition is satisfied, polyvinylpyrrolidone is uniformly dispersed in the vinyl chloride-based monomers, and thus the thermal stability of particle nuclei can be improved.

In addition, the bulk polymerization may comprise: bulk-polymerizing the vinyl chloride-based monomers to prepare particle nuclei; and bulk-polymerizing the vinyl chloride-based monomers in the presence of the particle nuclei and polyvinylpyrrolidone to prepare a vinyl chloride-based polymer composite. When the above-described condition is satisfied, high-pressure input equipment for inputting polyvinylpyrrolidone can be unnecessary, and most of the input polyvinylpyrrolidone can be utilized to improve the thermal stability and transparency of the vinyl chloride-based polymer composite.

The bulk polymerization may be performed in the presence of an initiator.

3. Composition

A composition according to still another embodiment of the present invention may include the vinyl chloride-based polymer composite according to an embodiment of the present invention or the vinyl chloride-based polymer composite according to another embodiment of the present invention.

In addition, the composition may include an additive including one or more selected from the group consisting of a stabilizer, a processing aid, an impact modifier, and a lubricant.

The additive may be included in an amount of 1 to 15 parts by weight, and preferably, 2 to 13 parts by weight with respect to 100 parts by weight of the vinyl chloride-based polymer composite.

The stabilizer is a substance that prevents coloration and decomposition by increasing stability against heat and may be a metal-based stabilizer or an organic acid metal salt stabilizer. The metal-based stabilizer may be one or two or more selected from the group consisting of a lead-based stabilizer, a (organic) tin-based stabilizer, a cadmium-based stabilizer, and a barium-based stabilizer. The organic acid metal salt stabilizer may be a stabilizer based on a metal salt of a carboxylic acid, organophosphate, or phenol. The carboxylic acid may be one or two or more selected from the group consisting of caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenyl stearic acid, ricinoleic acid, linoleic acid, linolenic acid, oleic acid, arachidic acid, behenic acid, erucic acid, brassidic acid, pseudo-acid, resin fatty acid, palm oil fatty acid, tung oil fatty acid, soybean oil fatty acid, cotton seed oil fatty acid, benzoic acid, p-t-butylbenzoic acid, ethylbenzoic acid, isopropylbenzoic acid, toluic acid, xylic acid, salicylic acid, 5-t-octylsalicylic acid, naphthenic acid, and cyclohexacarboxylic acid. The organophosphate may be one or two or more selected from the group consisting of monooctyl phosphate, dioctyl phosphate, monododecyl phosphate, didodecyl phosphate, monooctadecyl phosphate, dioctadecyl phosphate, mono(nonylphenyl) phosphate, di(nonylphenyl) phosphate, nonylphenyl ester phosphonate, and stearyl ester phosphonate. The phenol may be one or more selected from the group consisting of phenol, cresol, ethylphenol, cyclohexylphenol nonylphenol, and dodecylphenol. The metal salt may be a neutral salt, an acid salt, a basic salt, or a strong basic complex.

The processing aid is a substance that promotes the gelation of a vinyl chloride-based polymer, and examples thereof include: a homopolymer or copolymer based on an alkyl methacrylate such as methyl methacrylate, ethyl methacrylate, butyl methacrylate, and the like; a copolymer of the alkyl methacrylate and an alkyl acrylate; a copolymer of the alkyl methacrylate and an aromatic vinyl compound such as styrene, α-methyl styrene, vinyl toluene, and the like; a copolymer of the alkyl methacrylate and a vinyl cyanide compound such as acrylonitrile, methacrylonitrile, and the like; and the like, which may be used alone or in combination of two or more thereof.

The impact modifier is a substance that reinforces impact resistance by imparting elasticity to a vinyl chloride-based polymer and may be one or more selected from the group consisting of a methyl methacrylate-butadiene-styrene (MBS)-based polymer, a chlorinated polyethylene-based copolymer, an ethylene-vinyl acetate-based polymer, an acrylic polymer, and a butadiene-based polymer.

The lubricant is a substance that enhances the processability and interfacial properties of a vinyl chloride-based polymer, and examples thereof include: a hydrocarbon-based lubricant such as low molecular weight wax, paraffin wax, polyethylene wax, chlorinated hydrocarbon, fluorocarbon, and the like: a natural wax-based lubricant such as carnauba wax, candelilla wax, and the like; a fatty acid-based lubricant such as a higher fatty acid (e.g., lauric acid, stearic acid, behenic acid, and the like), an oxy fatty acid (e.g., hydroxy stearic acid), and the like; an aliphatic amide-based lubricant such as an aliphatic amide compound (e.g., stearyl amide, lauryl amide, oleyl amide, and the like), an alkylene bis aliphatic amide (e.g., methylene bis stearyl amide and ethylene bis stearyl amide), and the like; a fatty acid alcohol ester-based lubricant such as a fatty acid monohydric alcohol ester compound (e.g., stearyl stearate, butyl stearate, distearyl phthalate, and the like), a fatty acid polyhydric alcohol ester compound (e.g., glycerin tristearate, sorbitan tristearate, pentaerythritol tetrastearate, dipentaerythritol hexastearate, polyglycerin polyricinoleate, hydrogenated castor oil, and the like), a mono fatty acid (e.g., an adipic acid stearic acid ester of dipentaerythritol), and a composite ester compound of polybasic organic acid and polyhydric alcohol, and the like; an aliphatic alcohol-based lubricant such as stearyl alcohol, lauryl alcohol, palmityl alcohol, and the like; a metallic soap; a montanic acid-based lubricant such as a partially saponified montanic acid ester and the like; an acrylic lubricant; silicone oil; and the like, which may be used alone or in combination of two or more thereof.

Hereinafter, the present invention will be described in detail with reference to examples so that those skilled in the art can easily carry out the present invention. However, the present invention may be embodied in several different forms, and therefore, is not limited to examples described herein.

EXAMPLES AND COMPARATIVE EXAMPLES

Examples 1 to 5 and Comparative Example 1

140 kg of vinyl chloride monomers and 85 g of t-butyl peroxy neodecanoate as a reaction initiator were sequentially input into a preliminary polymerization reactor, which had been degassed so as to be a high vacuum (volume: 0.2 m$^3$). While maintaining stirring and raising the pressure to 12 kgf/cm$^2$, bulk polymerization was performed for 12 minutes to prepare a particle nuclei-containing mixture. In this case, a polymerization conversion rate was 10%.

80 kg of vinyl chloride monomers, the entire amount of the particle nuclei-containing mixture, and 200 g of 1,1,3,3-tetramethylbutyl peroxy neodecanoate as a reaction initiator were sequentially input into a main polymerization reactor (volume: 0.5 m$^3$). While maintaining stirring and a pressure of 7.5 kgf/cm$^2$, bulk polymerization was performed for 200 minutes so that a polymerization conversion rate reached 60%. Subsequently, 15 g of 4-hydroxy-2,2,6,6-tetramethyl-piperidine-1-oxyl and 100 g of triethylene glycol-bis-3-(3-t-butyl-4-hydroxy-5-methylphenyl)propionate were input into the main polymerization reactor, and unreacted vinyl chloride monomers were recovered under vacuum while maintaining stirring. Then, a thermal stabilizer listed in Table 1 below was input or not input, and thermal treatment was performed using steam and vacuum at 80° C. for 20 minutes to recover unreacted vinyl chloride monomers, thereby preparing a vinyl chloride-based polymer composite.

Examples 5 and 6 and Comparative Example 2

140 kg of vinyl chloride monomers, 85 g of t-butyl peroxy neodecanoate as a reaction initiator, and a thermal stabilizer listed in Table 2 below were sequentially input into a preliminary polymerization reactor, which had been degassed so as to be a high vacuum (volume: 0.2 m$^3$). While maintaining stirring and raising the pressure to 12 kgf/cm$^2$, bulk polymerization was performed for 1 minute to prepare a particle nuclei-containing mixture. In this case, a polymerization conversion rate was 10%.

80 kg of vinyl chloride monomers, the entire amount of the particle nuclei-containing mixture, and 200 g of 1,1,3,3-tetramethylbutyl peroxy neodecanoate as a reaction initiator were sequentially input into a main polymerization reactor (volume: 0.5 m$^3$). While maintaining stirring and a pressure of 7.5 kgf/cm$^2$, bulk polymerization was performed for 200 minutes so that a polymerization conversion rate reached 60%. Subsequently, 15 g of 4-hydroxy-2,2,6,6-tetramethyl-piperidine-1-oxyl and 100 g of triethylene glycol-bis-3-(3-t-butyl-4-hydroxy-5-methylphenyl)propionate were input and stirred. While maintaining the stirring, unreacted vinyl chloride monomers were recovered under vacuum, and then thermal treatment was performed at 80° C. for 20 minutes to recover unreacted vinyl chloride monomers, thereby preparing a vinyl chloride-based polymer composite.

Examples 7 and 8 and Comparative Example 3

140 kg of vinyl chloride monomers and 85 g of t-butyl peroxy neodecanoate as a reaction initiator were sequentially input into a preliminary polymerization reactor, which had been degassed so as to be a high vacuum (volume: 0.2 m$^3$). While maintaining stirring and raising the pressure to 12 kgf/cm$^2$, bulk polymerization was performed for 12 minutes to prepare a particle nuclei-containing mixture. In this case, a polymerization conversion rate was 10%.

80 kg of vinyl chloride monomers, the entire amount of the particle nuclei-containing mixture, 200 g of 1,1,3,3-tetramethylbutyl peroxy neodecanoate as a reaction initiator, and a thermal stabilizer listed in Table 2 below were sequentially input into a main polymerization reactor (volume: 0.5 m$^3$. While maintaining stirring and a pressure of 7.5 kgf/cm$^2$, bulk polymerization was performed for 200 minutes so that a polymerization conversion rate reached 60%. Subsequently, 15 g of 4-hydroxy-2,2,6,6-tetramethyl-piperidine-1-oxyl and 100 g of triethylene glycol-bis-3-(3-t-butyl-4-hydroxy-5-methylphenyl)propionate were input and stirred. While maintaining the stirring, unreacted vinyl chloride monomers were recovered under vacuum, and then thermal treatment was performed at 80° C. for 20 minutes, thereby preparing a vinyl chloride-based polymer composite.

Experimental Example 1: Evaluation of Color 30 g of the vinyl chloride-based polymer composite or vinyl chloride-based polymer according to each of the examples and comparative examples was input into a transparent sample bag, and the sample bag surface at the position to be measured was made flat without wrinkling. A whiteness index value and an a value were measured using a colorimeter (NR-3000 commercially available from Nippon Denshoku), and results thereof are shown in Tables 1 and 2. A higher whiteness index value indicates better color quality, and a lower a value indicates better color quality.

Experimental Example 2: Evaluation of Thermal Stability 100 parts by weight of the vinyl chloride-based polymer composite according to each of the examples and comparative examples, 5 parts by weight of a composite stabilizer (WPS-60 commercially available from Songwon Industrial.), 1.5 parts by weight of a processing aid (PA-822 commercially available from LG Chem.) 2 parts by weight of titanium oxide (DuPont Korea Inc.) and 2 parts by weight of an organic tartaric acid-based thermal stabilizer (SONGSTAB™ MT-800 commercially available from Songwon Industrial.) were mixed, and the mixture was subjected to roll milling at 185° C. for 3 minutes, thereby preparing a sheet 1. The whiteness index (W.I) value of the sheet 1 was measured using a colorimeter (NR-3000 commercially available from Nippon Denshoku), and results thereof are shown in Tables 1 and 2. A higher whiteness index value indicates better thermal stability.

Experimental Example 3: Evaluation of Transparency 100 parts by weight of the vinyl chloride-based polymer composite or vinyl chloride-based polymer according to each of the examples and comparative examples, 2 parts by weight of a mono, dimethyl tin mercaptide complex (SONGSTAB™ MT-800 commercially available from Songwon Industrial.) as a stabilizer, 1 part by weight of a processing aid (PA912 commercially available from LG Chem.), 5 parts by weight of an impact modifier (MB872 commercially available from LG Chem.), and 0.5 parts by weight of a lubricant (SONGSTAB™ SL-40 commercially available from Songwon Industrial.) were mixed, and the mixture was subjected to roll milling at 185° C. for 3 minutes, thereby preparing a preliminary sheet (thickness: 0.5 mm). The preliminary sheet was cut into a uniform size, a plurality of the preliminary sheets were stacked so that the total weight of the preliminary sheet was 45 g, and the stacked sheets were compressed through press processing, thereby preparing a 6 mm-thick sheet 2. The transmittance of the sheet 2 was measured using BYK-Gardner (Model Name: Haze-Gard plus), and results thereof are shown in the following Tables 1 and 2. A higher transmittance indicates better transparency.

TABLE 1

| Classification | | Comparative Example 1 | Example 1 | Example 2 | Example 3 | Example 4 |
|---|---|---|---|---|---|---|
| Thermal stabilizer (g) | Input timing | — | After the completion of preparation of PVC | After the completion of preparation of PVC | After the completion of preparation of PVC | After the completion of preparation of PVC |
| | PVP 1 | 0 | 33 | 0 | 0 | 0 |
| | PVP 2 | 0 | 0 | 33 | 0 | 1,100 |
| | PVP 3 | 0 | 0 | 0 | 33 | 0 |
| Content of thermal stabilizer with respect to 100 parts by weight of VCM (parts by weight) | | 0 | about 0.015 | about 0.015 | about 0.015 | about 0.49 |
| PVCC | Whiteness index | 86.0 | 90.1 | 90.1 | 90.0 | 91.0 |
| | a value | 1.1 | 0.4 | 0.2 | 0.4 | 0.1 |
| Sheet 1 | Whiteness index | 62.0 | 65.4 | 65.5 | 65.1 | 67.2 |
| Sheet 2 | Transmittance | 85.1 | 86.9 | 86.8 | 87.0 | 86.5 |

PVP 1: Polyvinylpyrrolidone (K15 commercially available from Ashland) having a weight-average molecular weight of 9,700 g/mol
PVP 2: Polyvinylpyrrolidone (K30 commercially available from Ashland) having a weight-average molecular weight of 66.800 g/mol
PVP 3: Polyvinylpyrrolidone (K90 commercially available from Ashland) having a weight-average molecular weight of 1,570,000 g/mol
VCM: Vinyl chloride monomer
PVC: Polyvinyl chloride
PVCC: Polyvinyl chloride composite

TABLE 2

| Classification | | Example 5 | Example 6 | Comparative Example 2 | Example 7 | Example 8 | Comparative Example 3 |
|---|---|---|---|---|---|---|---|
| Thermal stabilizer (g) | Input timing | In preparation of particle nuclei | In preparation of particle nuclei | In preparation of particle nuclei | In preparation of PVCC | In preparation of PVCC | In preparation of PVCC |

TABLE 2-continued

| Classification | | Example 5 | Example 6 | Comparative Example 2 | Example 7 | Example 8 | Comparative Example 3 |
|---|---|---|---|---|---|---|---|
| | PVP 1 | 220 | 0 | 0 | 220 | 0 | 0 |
| | PVP 2 | 0 | 11 | 0 | 0 | 660 | 0 |
| | PVP 3 | 0 | 0 | 0 | 0 | 0 | 0 |
| | TSPP | 0 | 0 | 220 | 0 | 0 | 220 |
| Content of thermal stabilizer with respect to 100 parts by weight of VCM (parts by weight) | | about 0.098 | about 0.0049 | about 0.098 | about 0.098 | about 0.29 | about 0.098 |
| PVCC | Whiteness index | 88.9 | 90.2 | 85.9 | 89.4 | 90.6 | 86.3 |
| | a value | 0.5 | 0.5 | 1.3 | 0.3 | 0.4 | 0.9 |
| Sheet 1 | Whiteness index | 65.1 | 65.1 | 63.8 | 65.7 | 66.9 | 64.1 |
| Sheet 2 | Transmittance | 86.3 | 87.5 | 85.2 | 86.4 | 86.6 | 85 |

PVP 1: Polyvinylpyrrolidone (K15 commercially available from Ashland) having a weight-average molecular weight of 9,700 g/mol
PVP 1: Polyvinylpyrrolidone (K30 commercially available from Ashland) having a weight-average molecular weight of 66,800 g/mol
PVP 2: Polyvinylpyrrolidone (K90 commercially available from Ashland) having a weight-average molecular weight of 1,570,000 g/mol
TSPP: Tetrasodium pyrophosphate
VCM: Vinyl chloride monomer
PVC: Polyvinyl chloride
PVCC: Polyvinyl chloride composite Referring to Table 1, the vinyl chloride-based polymer composites according to Examples 1 to 4, in which polyvinylpyrrolidone was input after the completion of preparation of a vinyl chloride polymer, exhibited high whiteness indices and low a values and thus achieved excellent color characteristics as compared to Comparative Example 1 in which polyvinylpyrrolidone was not input. Also, the sheets according to Example 1 to 4 were excellent in whiteness index and transmittance as compared to the sheet according to Comparative Example 1.

Meanwhile, referring to Examples 1 to 3, the weight-average molecular weight of polyvinylpyrrolidone did not greatly affect the properties of the vinyl chloride-based polymer composite and sheet.

Referring to Table 2, the vinyl chloride-based polymer composites according to Examples 5 and 6, in which polyvinylpyrrolidone was input in the preparation of particle nuclei, exhibited high whiteness indices and low a values and thus achieved excellent color characteristics as compared to the vinyl chloride-based polymer composite according to Comparative Example 2 in which tetrasodium pyrophosphate was input. Also, the sheets according to Examples 5 and 6 were excellent in whiteness index and transmittance as compared to the sheet according to Comparative Example 2.

Meanwhile, the vinyl chloride-based polymer composites according to Examples 7 and 8, in which polyvinylpyrrolidone was input in the polymerization process of preparing a vinyl chloride-based polymer composite, exhibited high whiteness indices and low a values and thus achieved excellent color characteristics as compared to the vinyl chloride-based polymer composite according to Comparative Example 3 in which tetrasodium pyrophosphate was input. Also, the sheets according to Examples 7 and 8 were excellent in whiteness index and transmittance as compared to the sheet according to Comparative Example 3.

The invention claimed is:

1. A method of preparing a vinyl chloride-based polymer composite, comprising:
   bulk-polymerizing vinyl chloride-based monomers to prepare a vinyl chloride-based polymer; and
   preparing the vinyl chloride-based polymer composite including the vinyl chloride-based polymer and polyvinylpyrrolidone.

2. The method of preparing a vinyl chloride-based polymer composite of claim 1, wherein the vinyl chloride-based polymer composite includes the polyvinylpyrrolidone in a state of being adsorbed onto the vinyl chloride-based polymer.

3. The method of preparing a vinyl chloride-based polymer composite of claim 1, wherein the polyvinylpyrrolidone has a weight-average molecular weight of 6,000 to 2,000,000 g/mol.

4. The method of preparing a vinyl chloride-based polymer composite of claim 1, wherein the vinyl chloride-based polymer composite includes the polyvinylpyrrolidone in an amount of 0.003 to 0.5 parts by weight with respect to 100 parts by weight of the vinyl chloride-based monomers.

5. The method of preparing a vinyl chloride-based polymer composite of claim 1, wherein the preparation of the vinyl chloride-based polymer is performed by the hulk-polymerizing the vinyl chloride-based monomers and then recovering unreacted vinyl chloride-based monomers.

6. A method of preparing a vinyl chloride-based polymer composite, comprising bulk-polymerizing vinyl chloride-based monomers in the presence of polyvinylpyrrolidone.

7. The method of preparing a vinyl chloride-based polymer composite of claim 6, wherein the polyvinylpyrrolidone is present in an amount of 0.003 to 0.5 parts by weight with respect to 100 parts by weight of the vinyl chloride-based monomers.

8. The method of preparing a vinyl chloride-based polymer composite of claim 6, wherein the bulk polymerization includes:
   bulk-polymerizing the vinyl chloride-based monomers in the presence of the polyvinylpyrrolidone to prepare particle nuclei; and
   bulk-polymerizing the vinyl chloride-based monomers in the presence of the particle nuclei to prepare the vinyl chloride-based polymer composite.

9. The method of preparing a vinyl chloride-based polymer composite of claim 6, wherein the bulk polymerization includes:

hulk-polymerizing the vinyl chloride-based monomers to prepare particle nuclei; and hulk-polymerizing the vinyl chloride-based monomers in the presence of the particle nuclei and polyvinylpyrrolidone to prepare the vinyl chloride-based polymer composite.

\* \* \* \* \*